(No Model.)
S. J. SHIMER.
GAGE FOR CUTTER KNIVES.
No. 602,778. Patented Apr. 19, 1898.
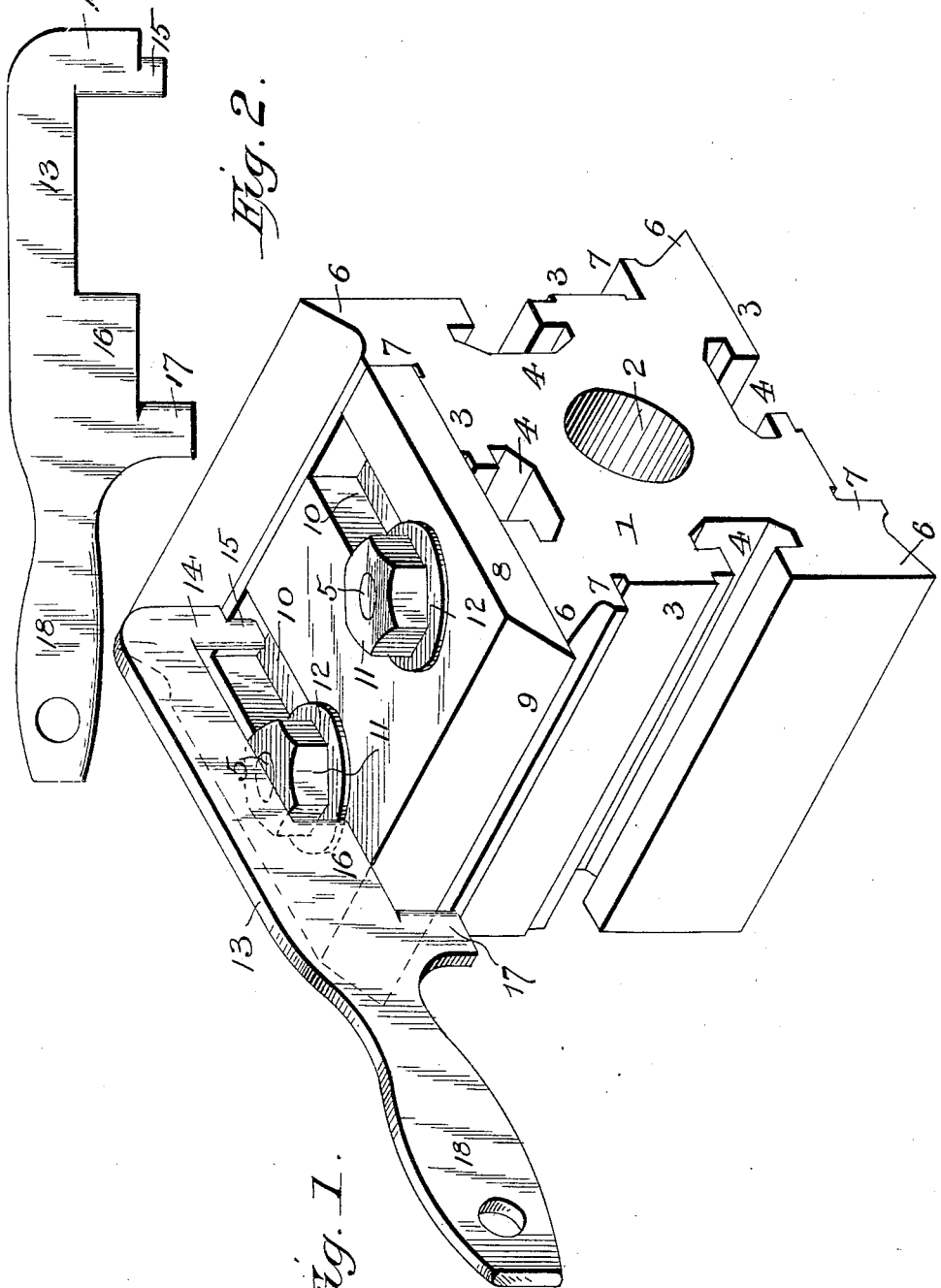
Witnesses:
Franck L. Ourand.
Inventor:
Samuel J. Shimer,
by Louis Bagger & Co.,
Attorneys.

UNITED STATES PATENT OFFICE.

SAMUEL J. SHIMER, OF MILTON, PENNSYLVANIA.

GAGE FOR CUTTER-KNIVES.

SPECIFICATION forming part of Letters Patent No. 602,778, dated April 19, 1898.

Application filed October 4, 1897. Serial No. 654,043. (No model.)

*To all whom it may concern:*

Be it known that I, SAMUEL J. SHIMER, a citizen of the United States, and a resident of Milton, in the county of Northumberland and State of Pennsylvania, have invented certain new and useful Improvements in Gages for Cutter-Knives; and I do hereby declare that the following is a full, clear, and exact description of the invention, which will enable others skilled in the art to which it appertains to make and use the same, reference being had to the accompanying drawings, which form a part of this specification.

My invention relates to gages for the knives or cutters of the rotary cutter-heads of woodworking machines and may be employed in connection with square, trapezoidal, or other shaped cutter-heads having seats or faces to receive the knives or cutters, with chip-breaks at the front ends and parallel longitudinal shoulders near the rear or inner ends.

The object of the invention is to provide an improved gage by means of which the cutters or knives can be readily and accurately set in a line parallel to the chip-break, and also at proper distances therefrom throughout the length thereof.

The invention consists, essentially, in a metal plate cut away along one edge, forming an arm with a notch in the end at the outer side thereof adapted to engage with the shoulder of a cutter-head, a shoulder opposite said arm adapted to engage with the upper side of the cutter or knife near the cutting edge, and a lug or shoulder in rear of and projecting beyond said shoulder for determining the position of the cutting edge, as hereinafter fully described and claimed.

In the accompanying drawings, Figure 1 is a perspective view of a rotary cutter-head, showing my improved gage in connection therewith. Fig. 2 is an elevation of the gage.

In the said drawings the reference-numeral 1 designates a cutter-head formed with a central hole 2 for the passage of the spindle or mandrel, by which it is rotated, and formed with four cutter or knife faces or seats 3. The cutter-head illustrated is a square head; but the invention is applicable to trapezoidal or other shaped heads and to heads having more or less cutter or knife seats. These seats or faces are formed with T-grooves 4 to receive the headed bolts 5, by which the cutters or knives, hereinafter described, are held in place. The numeral 6 designates chip-breaks at the front ends of said knife or cutter seats, and 7 parallel longitudinal shoulders near the opposite or rear ends.

The numeral 8 designates a cutter or knife formed with a cutting edge 9 at the front side, and at the rear side formed with slots 10 for the passage of the bolts 5. Nuts 11 and washers 12 are employed for securely clamping the cutters or knives on their seats.

The numeral 13 designates the gage, consisting of a metal plate cut away along one edge, forming an arm 14, having a rectangular notch 15 at the outer side of the end. Opposite this arm is a shoulder 16, and in rear thereof a lug or shoulder 17, projecting beyond the arm 15 and shoulder 16.

The manner of using the device is as follows: A knife or cutter is placed in its seat and the headed bolts engaged therewith and the nuts screwed loosely home, so as to allow the knife to be adjusted by moving it in or out. The gage is now applied, the notch 15 engaging with the shoulders 7 of the head and the shoulder 16 resting on the upper side of the knife near the cutting edge. By now adjusting or moving the knife so that the cutting edge will come in contact with the lug or shoulder 17 the proper distance the cutting edge should project beyond the chip-break will be determined, which will consequently insure that the cutting edge will be in parallelism with the edge of the chip-break, as it will be the same distance therefrom at all points throughout its length. By this invention the knives can be readily and quickly gaged or adjusted with respect to the cutter-head.

The gage, for convenience in handling, is formed at the end opposite the notched arm with a handle 18; but this is not essential.

Having thus fully described my invention, what I claim is—

As an improved article, a gage for the knives or cutters of rotary cutter-heads consisting in the plate cut away along one edge forming an arm with a notch in its end at the outer side, adapted to engage with a longitudinal shoulder on a cutter-head, and a shoulder opposite said arm adapted to engage with the upper side of a knife or cutter, and in rear of said shoulder formed with a lug or shoulder for determining the position of the cutting edge of the knife or cutter, substantially as described.

In testimony that I claim the foregoing as my own I have hereunto affixed my signature in presence of two witnesses.

SAMUEL J. SHIMER.

Witnesses:
W. H. BECK,
JOHN A. BECK.